UNITED STATES PATENT OFFICE.

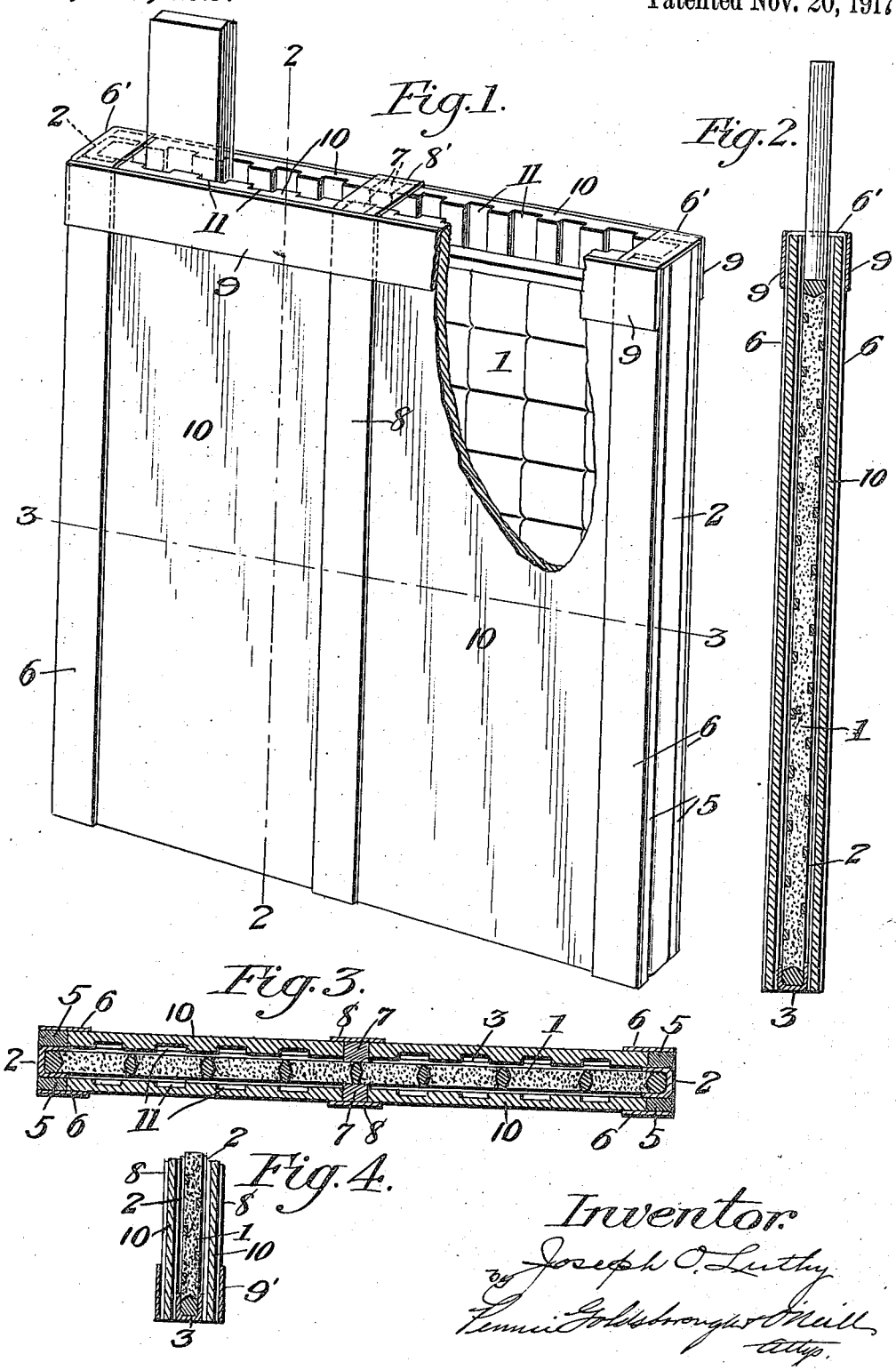

JOSEPH O. LUTHY, OF SAN ANTONIO, TEXAS.

PLATE-GUARD FOR SECONDARY BATTERIES.

1,247,122.  Specification of Letters Patent.  Patented Nov. 20, 1917.

Application filed April 16, 1917. Serial No. 162,399.

*To all whom it may concern:*

Be it known that I, JOSEPH O. LUTHY, a citizen of the Republic of Switzerland, and a resident of the city of San Antonio, county of Bexar, State of Texas, have invented certain new and useful Improvements in Plate-Guards for Secondary Batteries; and I do hereby declare the following to be a full, clear, and exact description of the invention, such as will enable others skilled in the art to which it appertains to make and use the same.

The invention relates to guard sheaths or envelops for secondary battery plates of the same general character as presented in my companion application, Serial No. 162,400, filed of even date herewith, and has for its object to provide a light, rigid and inexpensive frame of acid-proof material, adapted to be built up around the plate, that will surround the plate at all of its edges, except the top edge, so as to protect the exposed metal of the plate, the several elements of the frame being so arranged and assembled as to admit of separator sections of porous or pervious material, being applied from the bottom of the frame and held in proper covering juxta-position to both faces of the battery plate, so that the plate is substantially supported against vibration and rigidly held against buckling, and the separators are maintained in proper relation without strain, to prevent short-circuiting of adjacent plates, disintegration of the filling of the protected plate and breaking of the separators, and at the same time, admitting of a free vertical and transverse circulation of the electrolyte with respect to the plate. The particular construction and arrangement of the frame and the separators associated therewith is such as to absolutely prevent disintegration of the metallic frame of the plate grid, due to local action, to admit of thinner plates and thinner separators being used, and at the same time, to minimize the danger of breaking the jars or containers, due to movement of the plates, and to practically eliminate the effect of self discharge and the so-called growing of the battery plates.

The invention is illustrated in the accompanying drawings, in which,

Figure 1 is a perspective view of a positive battery plate having the improved sheath or envelop applied thereto.

Fig. 2 is a vertical section on line 2—2 of Fig. 1.

Fig. 3 is a horizontal section on line 3—3 of Fig. 1, and

Fig. 4 is a fragmentary view corresponding to Fig. 2, showing a modified construction of the lower portion of the frame.

Referring to the drawings, 1 indicates the positive plate of a secondary battery, which may be of any approved or desired form, and which usually consists of a plate-like grid or framework of cast metal, adapted to be filled with and to retain a paste of active material. As is well known, plates of this character are subject to many and varied injuries, dangers and disabilities, due to the peculiar action of charging and discharging batteries, of which they constitute a part, as well as to the shocks and jars imposed upon the plates due to the exigencies of use.

The present invention is designed to overcome the many difficulties heretofore encountered in the construction and use of secondary batteries and to provide a simple, cheap and economical form of envelop or container for the positive plate, which will insure a long and efficient life not only of the individual plate but of the battery of which it forms a component part. To effect these objects, it is the purpose of the present invention to provide a sheath or envelop which includes a strong, rigid framework adapted to surround and protect the exposed metal edges of the plate, except the upper edge, which is not in contact with the electrolyte, with which framework is associated freely removable slabs or sheets of wood or like pervious material which constitute the separator elements and overlie the active material of the plates and which admit of a free lateral passage of the electrolyte and also a free vertical circulation thereof.

The supporting frame, which is preferably made of celluloid or similar acid-proof material, capable of being cut into strips and sections, which may be united at their meeting portions by cementing joints produced by the application of amyl acetate or the like, is preferably constructed and arranged as follows. Along each vertical edge of the plate is applied a channel-like section 2, of celluloid, which closely embraces the metal edge of the plate and prevents access of the electrolyte thereto. A similar channel-like section 3 is secured to the bottom edge of the plate and also to the side channel-members 2. Secured to the side flanges of each of the channel members 2 is a flange-forming member which may be formed either of an L-shaped strip of celluloid or of two strips of celluloid 5 and 6, which when united constitute an L-shaped member, the outer section of which extends inwardly and constitutes an overhanging flange spaced from the plate at a sufficient distance to retain the edge of an inserted separator to be hereinafter referred to. Intermediate the end portions of the frame and on either side are provided flanged vertical strengthening ribs which are preferably formed of strips 7 to the outer faces of which are cemented thinner strips 8, the edges of which latter extend laterally and constitute retaining flanges corresponding to the flanges 6. These strengthening ribs are cemented to the channel member 3 at the bottom of the plate and the upper end of one of the strips 8 is preferably bent horizontally and carried over to the opposite strengthening rib to which it is cemented, and thereby constitutes a rigid bridge piece 8', which braces the open top of the frame and holds the sides in proper spaced relation. Similarly the upper ends of one of the flange forming strips 6 at each edge of the frame is carried over and cemented to the opposite side to form bridge pieces 6'. Across the top portions of the frame are secured horizontal braces 9, one on either side, which are united to the sections 6 and 8 and serve further to brace and strengthen the frame against lateral distortion in any direction.

It will be particularly noted that the frame as thus constructed provides panel-like sections defined by the flange members 6 and 8 on either side, which are open at the bottom to admit of the free insertion and removal of the separator elements, which are preferably formed of wood or similar porous or pervious material, said separators being made of thin slabs 10 having their inner faces channeled or corrugated as at 11 to permit a free circulation of the electrolyte in a vertical direction.

In applying the sheath to the battery plate, the several elements constituting the frame are assembled about the plate, preferably in the order hereinbefore referred to, so that the plate is rigidly held within the framework, which latter effectively resists any tendency of the frame or grid of the plate to buckle or distort. After the frame has been built up around the plate, the separator elements 10 are slid in to the frame through the bottom openings of the latter and under the projecting portions of the flange members 6 and 8, so that the separators overlie the active material of the plate, and in close juxtaposition thereto, thereby preventing any of the active material working loose or becoming displaced from the grid. Whenever necessary, any or all of the separators 10 may be removed from the frame by withdrawing them from the bottom, without danger of injuring the plate or disturbing the relative arrangement of the plate and its inclosing frame. When the separators have been properly assembled within the frame and overlie the plate, it will be noted that they will be held firmly in position against any lateral movement, by the retaining flanges 6 and 8 of the frame, and, of course, any vertical movement of the separators will be prevented by the supports on which the plate and its inclosing frame rest on the one hand, and by the bridge pieces 6' and 8' connecting the top edges of the frame, on the other. It will also be noted that the channels or corrugations in the separators 10 are free and unobstructed throughout their length so that the electrolyte may circulate freely in a vertical direction. The thin, porous, sheet-like form of the separators also insures a perfect circulation of the electrolyte between adjacent plates.

In case relatively large plates are employed, it may be found advisable or desirable to brace or strengthen the lower edges of the frame, and this may be effectively accomplished by the construction illustrated in Fig. 4, in which cross braces 9' are cemented to each lower edge of the frame in substantially the same manner and arrangement as the upper cross braces 9. It will be noted that this arrangement of the lower braces 9' leaves the spaces in the lower edge of the frame between the channel-like member 3 and the flange members 6 and 8 unobstructed so that the separators 10 may be slid into and out of position with respect to the plate and the frame, as before described, and the channels or corrugations in the separators left free and unobstructed throughout their lengths.

It will be understood that, as a general proposition, it is necessary to provide the positive plate only with a sheath or guard, comprising the frame and the removable separators, but if desired, the negative plate may be similarly provided, but in no case, is it possible for any material to short-circuit adjacent plates, as there are no openings or perforations, other than the pores of the pervious separators 10, in the lateral faces or vertical edges of the sheath or envelop, so that it is a practical impossibility for any material, other than the electrolyte, to connect or bridge adjacent plates.

It has been repeatedly demonstrated that a battery plate provided with a supporting frame and separators, as shown and described, is immune from buckling effect, is longer lived and much more efficient than the usual battery plate employing other forms of separators, and is far more economical of maintenance than other types of protected plate with which applicant is familiar.

What I claim is:—

1. A sheath or envelop for secondary battery plates, comprising a rigid skeletonized built-up frame of acid-proof material, including channel-like sections embracing the bottom and side edges of the plate, flange-forming sections secured to the side channel sections, vertical intermediate flanged strengthening ribs at the sides, and horizontal cross braces secured to the vertical flange sections; and freely removable sections of porous material confined by the flange-forming sections and held in covering juxtaposition to the faces of the plate.

2. A sheath or envelop for secondary battery plates, comprising a rigid skeletonized built-up frame of acid-proof material, including channel-like sections embracing the bottom and side edges of the plate, flange-forming sections secured to said side channel sections, vertical intermediate flanged strengthening ribs at the sides, horizontal cross braces secured to the vertical flange sections, bridge pieces connecting the top edges of the frame, and channeled slabs of porous material held in covering juxtaposition to the faces of the plate by the flanged sections and freely removable from the bottom of the frame.

3. A rigid acid-proof frame for battery plate sheaths, including channel-like sections embracing the bottom and side edges of the plate, inwardly extending flange-forming sections secured to the side channel sections and extending over the top to form bridge members, vertical intermediate strengthening ribs having lateral flanges extended to form a connecting bridge across the top, and horizontal cross braces connecting the said sections and the intermediate rib sections, the parts being so constructed and arranged as to permit separator slabs being inserted from the bottom of the frame and retained by the flange-forming sections.

In testimony whereof I affix my signature.

JOSEPH O. LUTHY.